United States Patent [19]
Adam et al.

[11] Patent Number: 5,528,093
[45] Date of Patent: Jun. 18, 1996

[54] COMMUTATOR-MOTOR GEAR/DRIVE UNIT, IN PARTICULAR A WINDOW-LIFT DRIVE FOR A MOTOR VEHICLE

[75] Inventors: Peter Adam, Hoechberg; Peter Michel, Kleinrinderfeld; Rudolf Fiedler, Bad Mergentheim, all of Germany

[73] Assignee: Siemens Aktiengesellschaft, München, Germany

[21] Appl. No.: 218,545

[22] Filed: Mar. 28, 1994

[30] Foreign Application Priority Data

Mar. 31, 1993 [EP] European Pat. Off. .............. 93105355

[51] Int. Cl.$^6$ ............................ H02K 11/00; H02K 5/14; H02K 13/00
[52] U.S. Cl. .............. 310/89; 310/71; 310/239; 310/68 R
[58] Field of Search ................. 310/68 R, 71, 310/83, 89, 239

[56] References Cited

U.S. PATENT DOCUMENTS

| | | | |
|---|---|---|---|
| 4,572,979 | 2/1986 | Haar et al. | 310/68 R |
| 4,614,886 | 9/1986 | Schneider et al. | 310/83 |
| 4,978,876 | 12/1990 | Koster | 310/239 |
| 5,041,751 | 8/1991 | Yokozuka | 310/239 |
| 5,184,039 | 2/1993 | Kraft | 310/89 |
| 5,194,769 | 3/1993 | Ade et al. | 310/89 |
| 5,309,053 | 5/1994 | Ade | 310/71 |
| 5,382,857 | 1/1995 | Schellhorn et al. | 310/83 |
| 5,444,315 | 8/1995 | Adam et al. | 310/42 |

FOREIGN PATENT DOCUMENTS

| | | | |
|---|---|---|---|
| 0474904 | 12/1992 | European Pat. Off. . | |
| 4120665 | 12/1992 | Germany . | |
| 4233156 | 4/1994 | Germany | 310/239 |
| 4315404 | 11/1994 | Germany | 310/239 |
| 2079540 | 1/1982 | United Kingdom . | |
| 2209438 | 5/1989 | United Kingdom . | |

*Primary Examiner*—Clayton E. LaBalle
*Attorney, Agent, or Firm*—Kenyon & Kenyon

[57] ABSTRACT

To integrate electronics with a drive unit, given a simple manufacturing or assembly, and a compact type of construction, a printed-circuit board, which accommodates the electronic components and which is designed, at the same time, as a brush-holder plate for the commutator motor, is arranged, together with an electronic housing, parallel to housing flanges of a motor housing, of a gear housing. The printed circuit board of the drive unit, and is covered on its one axial side by the motor housing and the electronic housing, and on its other axial side by the gear housing thereby protecting it from external elements.

20 Claims, 3 Drawing Sheets

COMMUTATOR-MOTOR GEAR/DRIVE UNIT, IN PARTICULAR A WINDOW-LIFT DRIVE FOR A MOTOR VEHICLE

BACKGROUND OF THE INVENTION

The present invention relates to a commutator-motor gear/drive unit and in particular, a window-lift drive for a motor vehicle, the drive having a motor housing with a front-side housing flange, a gear housing with a front-side housing flange, and an electronic housing with a printed circuit board including an integrated brush-holder plate for the commutator motor. A similar drive unit is discussed in the European Patent No. EP-A1-0 474 904.

In the drive unit disclosed by the European Patent No. EP-A1-0 474 904, the printed-circuit board is integrated with the brush-holder plate and is inserted into an extension of the cup-shaped gear housing in a direction perpendicular to a plane defined by the housing flange. The gear housing is tightly sealed with a cover able to be assembled perpendicularly to the plane defined by the housing flange. The commutator is arranged on the rotor shaft of the commutator motor and extends into the gear housing. The commutator extends axially beyond the plane of the housing flange into the gear housing. The commutator is wiped there by brushes which are mounted on an extension of the printed-circuit board that projects into the gear housing.

In United Kingdom Patent No. GB-A-2 079 540 (and in the German Patent Application No. DE-A1-30 21 948, which establishes priority of United Kingdom Patent No. GB-A-2 079 540), FIGS. 4–8, illustrate an electric commutator gear/drive unit, in particular for windshield wipers of a motor vehicle. In this gear/drive unit, a plug-connector housing running parallel to the motor housing has a base plate. The base plate runs essentially parallel to the front-side housing flanges of the motor housing and the gear housing and accommodates attachment plugs. The base plate comprises a one-piece brush-holder plate to accommodate the brushes. The base plate (or the brush-holder plate) projects, on the rim side, radially between the front flange of the motor housing and the gear housing. The base plate is retained by clamping it between the front flange of the motor housing and the gear housing.

The object of the present invention, given a simplified manufacturing and assembly, is to achieve a more compact construction for a drive unit provided with an electronics protected from the external environment, in particular for a window-lift drive as used in a motor vehicle.

SUMMARY OF THE INVENTION

The present invention solves the aforementioned objective by providing a commutator-motor gear/drive unit comprising a motor housing with a front-side housing flange, a gear housing with a front-side housing flange, and an electronic housing with a printed circuit board including an integrated brush-holder plate for the commutator motor. The printed circuit board lies essentially parallel to the front side housing flanges and radially and axially within the motor housing and gear housing. The printed circuit board is tightly sealed off from the external environment by the motor housing, the electric housing, and the gear housing. A first axial surface of the printed circuit board is covered by the gear housing while a second axial surface of the printed circuit board is covered by both the motor housing and the electronic housing.

The design of the present invention of a commutator-motor gear/drive unit creates a constructional unit that can be assembled in an axial mounting process that is advantageous from a standpoint of production engineering. The printed-circuit board accommodated in the plane of the housing flange can be assembled in a protected cover inside the motor housing and the gear housing. When the housings are assembled, the constructional unit forms a compact drive unit that can be manufactured and assembled with little expenditure.

An electronic housing is advantageously provided to accommodate, while protecting, electric and/or electronic components that are retained and are contacting on the printed-circuit board. The electronic housing has a first electronic housing part essentially corresponding to a front-side contour of the housing flange of the commutator motor and a radially adjacent second electronic housing part, which extends, in a shell shape, underneath the motor housing of the commutator motor. The open, axial loading side of the shell-shaped part of the electronic housing contours components held on the printed-circuit board and faces the gear flange. The open, axial loading side of the shell-shaped part of the electronic housing is simultaneously sealed off by the corresponding, merely radially expanded housing flange of the gear housing when it is mounted on the motor housing. A plug receptacle with a sealed plug connector is expediently provided in the shell-type base of the second housing part. The plug connector leads to the outside and can be connected to conductor leads of the printed-circuit board.

To further simplify the assembly of the commutator-motor gear/drive unit according to the present invention, the printed-circuit board is preassembled, either in the second electronic housing part, or in the diametrically opposed housing flange of the gear housing. This preassembly should be done such that the printed-circuit board can be assembled either with the intermediate electronic housing when the motor housing is being assembled or with the gear housing when the gear housing is being assembled, without necessitating any additional manipulative movements for such a supplying of subassemblies. Also, after the assembly, this preassembly should allow the printed-circuit board to be supported inside the motor housing and the gear housing, so that it is protected by their sealed arrangement, in which one housing lies axially in front of the other.

To achieve a crush-free, tight, reciprocal contact of the housing flanges while simultaneously including the electronic housing in-between when assembling the motor housing, on the one hand, and the gear housing, on the other hand, one refinement of the present invention includes one, in particular sprayed-on sealing rim to be applied to each of the two front-side contact rims of the electronic housing. The front side of the housing flange of the motor housing, on the one hand, and the front side of the gear flange of the gear housing, on the other hand abut against these contact rims.

DETAILED DESCRIPTION

Figure 1:
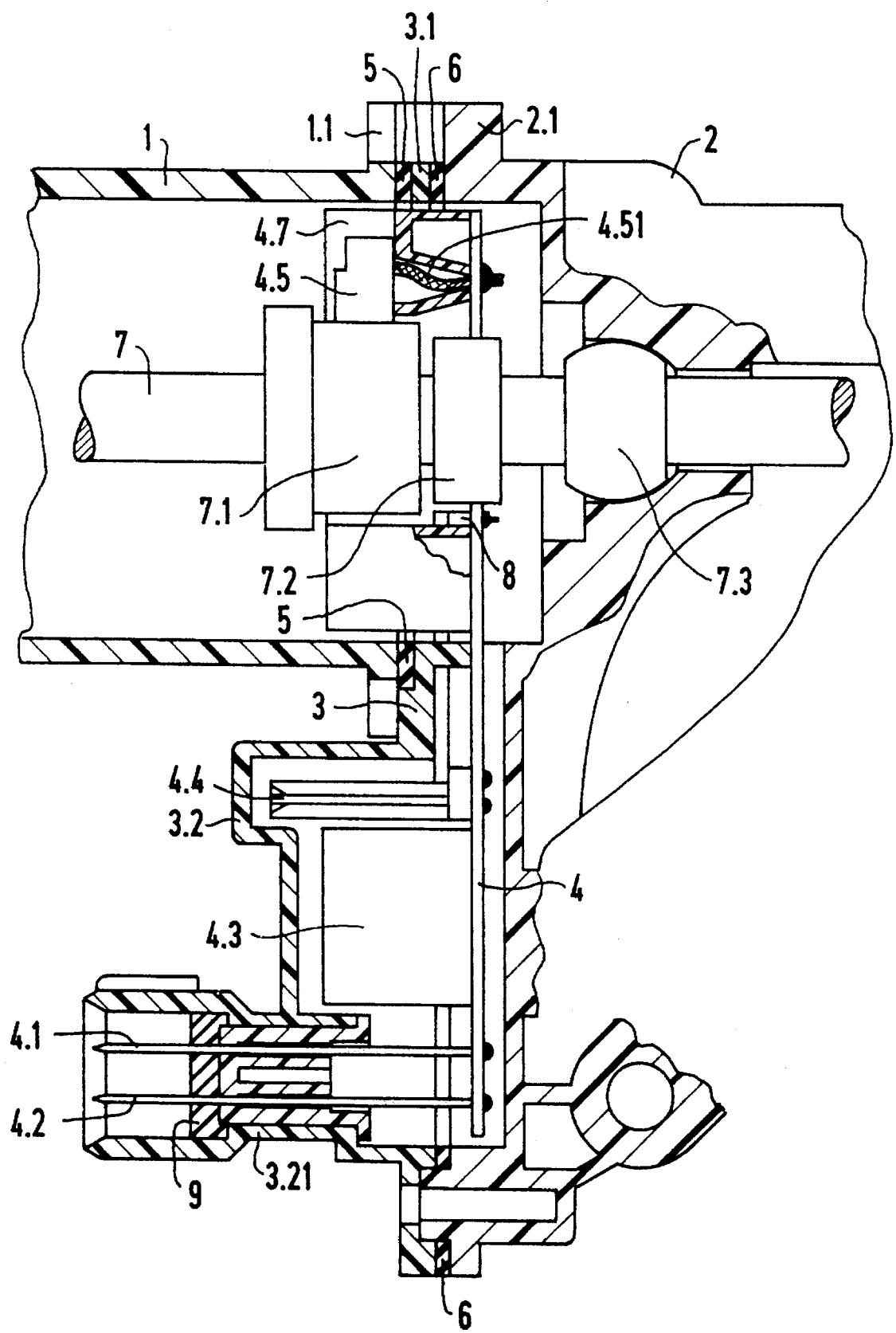
FIG 1 is a cut-away portion of an axial longitudinal section of a window-lift drive for a motor vehicle in the area of the housing flange of the motor housing, and the gear housing capable of being assembled together.

FIG 1 depicts a window-lift drive for a motor vehicle. The drive includes a plastic motor housing 1 and a plastic gear housing 2 which is flange-mounted on to the motor housing 1. To permit the assembly of the motor housing 1 and the gear housing 2, the motor housing 1 has a housing flange 1.1, and the gear housing 2 has a housing flange 2.1. These flanges are held together with an axial screw coupling, by means of radially projecting housing-flange rims, in a manner not shown in greater detail here. An electronic housing 3 is clamped between the housing flanges 1.1 and 2.1. In an area to be held adjacent to the motor housing 1, as is especially apparent from FIGS. 3 and 4, the electronic housing 3 includes a first electronic-housing part 3.1, essentially having only one contact rim. The electronic housing 3 also includes a second a electronic-housing part 3.2, essentially for accommodating a printed-circuit board 4. The printed-circuit board 4 is fitted with electronic or electric components, or including a plug receptacle.

The printed-circuit board 4 is inserted so that it can be preassembled in the electronic housing 3. Brushes 4.5 and 4.6 are contained in the area of the first electronic-housing part 3.1 by the printed-circuit board 4 which is designed there as a brush-holder plate. The brushes 4.5 and 4.6 allocate power to a commutator 7.1 arranged on the rotor shaft 7 of the commutator motor. The rotor shaft 7, which is supported, inter alia, in a cup-shaped bearing 7.3, projects as a worm shaft into the gear housing 2.

In its radial, lower part, the printed-circuit board 4 is essentially used to accommodate an insertable chip plate 4.4, a relay 4.3, as well as plug connector parts 4.1 and 4.2. While being sealed by a plug seal 9, the plug connector parts 4.1 and 4.2 lead through a plug receptacle 3.21 in the second electronic housing part 3.2 to the outside at which a customer's plug connector may be connected. A Hall sensor 8 is arranged in the upper part of the printed-circuit board 4 adjacent to a magnet wheel 7.2. The magnet wheel 7.2 is retained on the rotor shaft 7 and serves as a speed (or rotation) sensor.

All of the component parts mounted on the printed-circuit board 4 and to be contacted by this board assembly (or among themselves), in particular the plug connector parts 4.1 and 4.2, the relay 4.3, the chip plate 4.4, the Hall sensor 8, as well as brush shunts 4.51 leading to the brushes, are advantageously assembled such that they can be axially supplied from the front side of the printed-circuit board 4 (on the side of the motor housing) and such that they can be contacted by means of the dip-soldering of contact pins inserted through the printed-circuit board 4 to its back side.

A sealing rim 5, 6 is sprayed on to each of the two front sides of the electronic housing 3 clamped between the motor housing 1 and the gear housing 2 on the side of the contact rim. The sealing rim 5 allows the housing flange 1.1 of the motor housing 1 to sealingly abut against one contact rim of the first electronic-housing part 3.1. Similarly, the sealing rim 6 allows the gear flange 2.1 of the gear housing 2 to sealingly abut against the other contact rim of the first electronic housing 3.1. Further the gear housing 2 radially extends to the bottom such that it can serve as a cover for the open board-assembly loading side of the electronic housing 3. Thus, the sealing rim 6 further allows the gear flange 2.1 of the gear housing 2 to sealingly abut against the second electronic housing part 3.2. As a result, the printed-circuit board 4, which is capable of being preassembled in the electronic housing 3, and the integrated brush-holder plate are advantageously covered and protected from external moisture.

Figure 4:
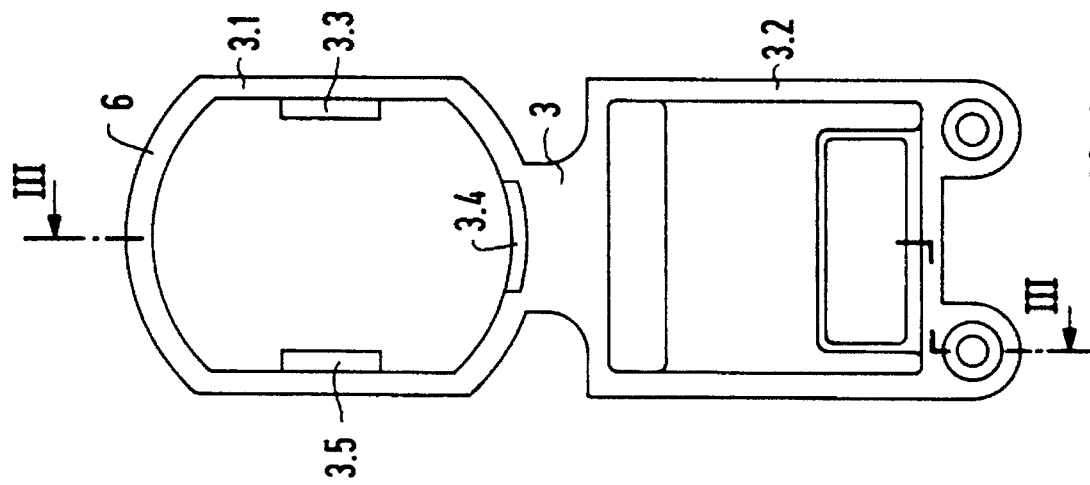
FIG. 4 is an axial, front end view of the electronic housing according to FIG. 3 showing the side facing the gear housing.
Figure 3:
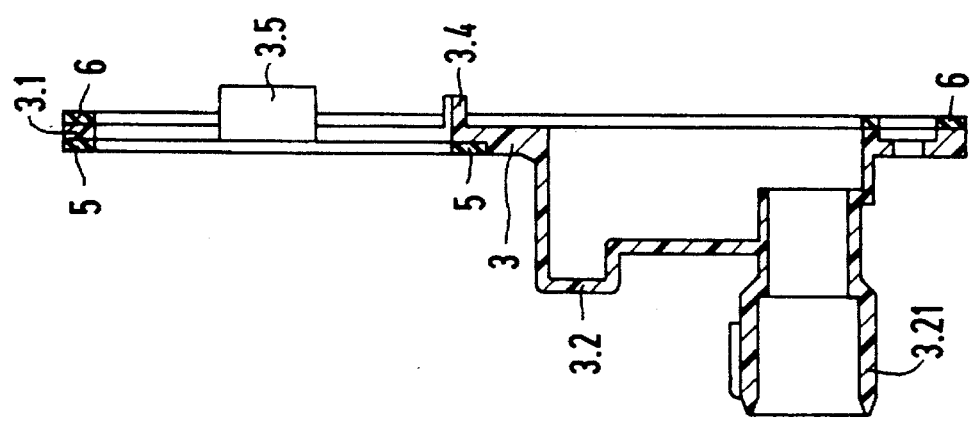
FIG. 3 is an axial longitudinal cross section, along line III—III of FIG. 4, of the electronic housing capable of being fixed in position between the housing flanges.
Figure 2:
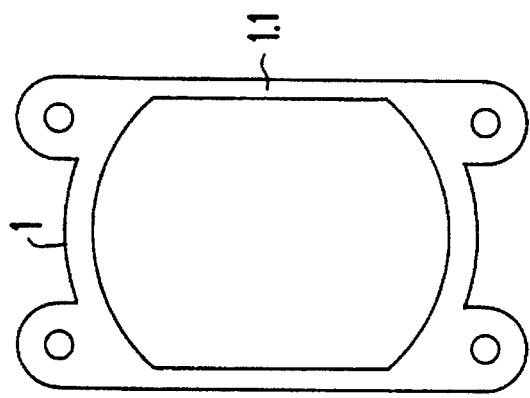
FIG. 2 is an axial, front end view of the housing flange of the motor housing.

As shown in FIGS. 3 and 4, the electronic housing 3 is braced by bearing webs 3.3, 3.4 and 3.5 against the housing flange 2.1 of the gear housing 2. The bearing webs 3.3, 3.4 and 3.5 ensure adequate clearance between the housing flange 2.1 and the rear side of the printed-circuit board 4. The covering provided by the housing flange 2.1 of the gear housing 2, and the moisture-proof bearing arrangement of the cup-shaped bearing 7.3, also guarantee that any moisture from the gear housing 2 can not penetrate to the electronic housing 3.

Figure 8:
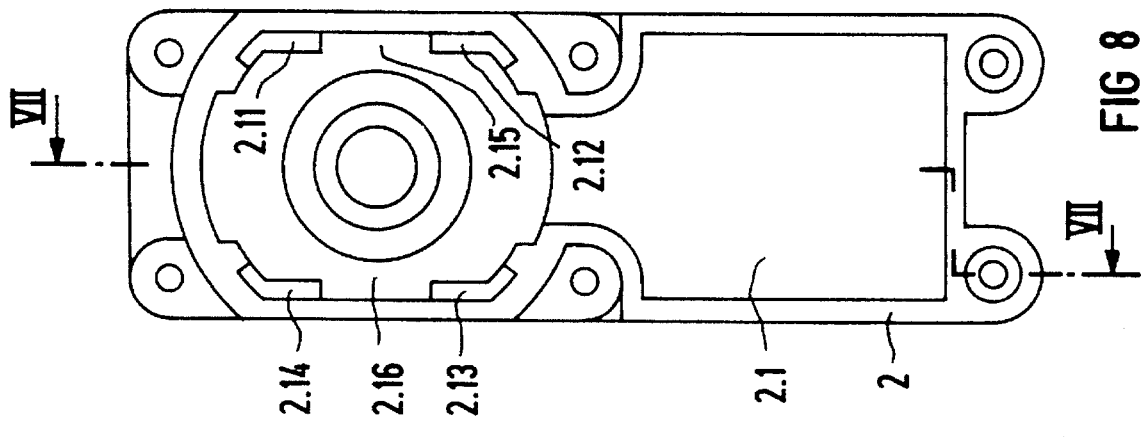
FIG. 8 is the axial, front end view of the gear housing according to FIG. 7, showing the side facing the motor housing.
Figure 7:
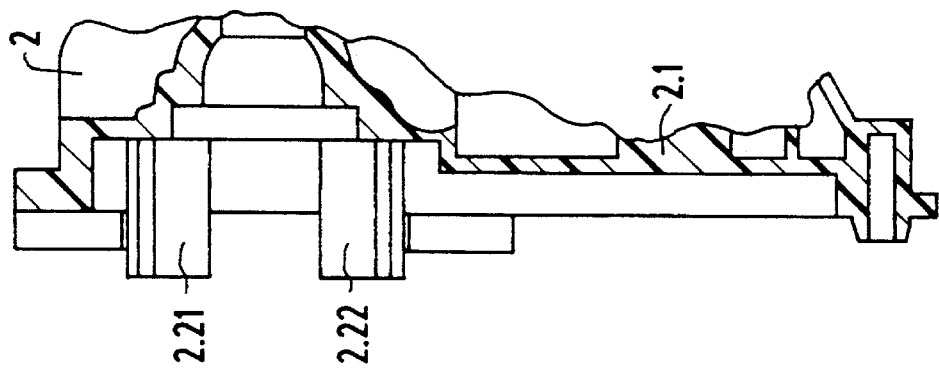
FIG. 7 is an axial longitudinal cross section, along line VII—VII of FIG. 8, of a cut-away portion of the gear housing in the area of the housing flange. 5
Figure 6:
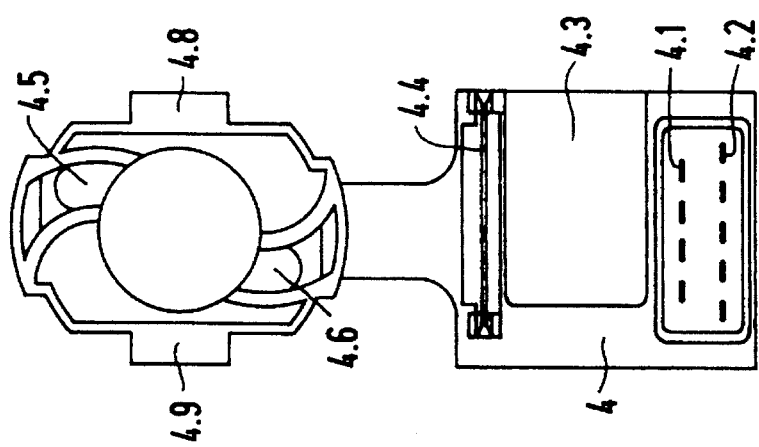
FIG. 6 is the axial, front end view of the printed-circuit board according to FIG. 5, showing the side facing the motor housing.
Figure 5:
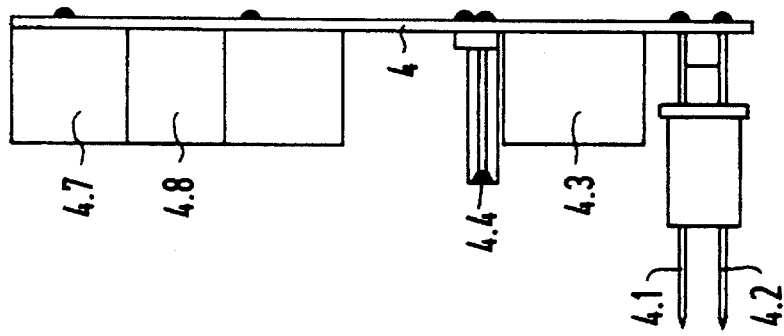
FIG. 5 is an axial side view of the printed board assembly.

As shown in FIG. 8, to simplify an axial mounting assembly, axially projecting guide webs 2.11–2.14, which fit into corresponding stepped, guide receptacles of the printed-circuit board 4 (see FIG. 6), are advantageously premolded on the housing flange 2.1 of the gear housing 2. In the same way, the printed-circuit board 4 has oppositely projecting guide webs 4.8 and 4.9, which fit into corresponding guide receptacles 2.15 and 2.16 of the housing flange 2.1 of the gear housing 2. A guide sleeve (or covering sleeve) 4.7 premolded on the printed-circuit board 4 covers the brush and commutator area of the commutator motor and serves, at the same time, to align (or fix) the printed-circuit board 4 in position relative to the motor housing flange 1.1 of the commutator motor.

When all important subassemblies are mounted in the advantageous axial assembly operation according to the present invention, only one handling and insertion direction is needed to expediently fit the motor housing 1 with all rotor components. The electronic housing 3, including the preassembled printed-circuit board 4, and finally the gear housing 2 are then installed. The compact constructional unit is put together by mutually bracing the motor housing 1 and the gear housing 2. The printed-circuit board 4, together with the electronics, is tightly sealed from external elements.

What is claimed is:

1. A commutator-motor gear drive unit, having a rotor shaft defining an axial direction, comprising:
   a) a motor housing having a front-side housing flange;
   b) a gear housing having a front-side housing flange;
   c) an electronic housing; and
   d) a printed-circuit board, said printed circuit board
      i) including an integrated brush-holder plate for the commutator motor,
      ii) arranged essentially parallel to said front-side housing flange of said motor housing and said front-side housing flange of said gear housing,
      iii) arranged radially and axially within said motor housing and said gear housing, and
      iv) being tightly sealed off from external elements on a first axial side by said motor housing and said electronic housing, and on a second axial side by said gear housing.

2. The drive unit of claim 1 wherein said gear housing includes a radially expanded housing flange, and wherein said electronic housing includes:

i) a first electronic housing part essentially corresponding to a front-side contour of said front-side housing flange of said motor housing; and ii) a second electronic housing part being radially adjacent to said first electronic housing part, and extending in a shell shaped section axially adjacent to said motor housing, said shell shaped section having an open, axial loading side which is sealed against, and which corresponds to, said radially expanded housing flange of said gear housing.

3. The drive unit of claim 2 wherein said shell shaped section of said second shell-shaped housing part includes a plug receptacle with a sealed plug connector that leads to the outside and which is connected to conductor leads of said printed-circuit board.

4. The drive unit of claim 2 wherein said printed-circuit board is fitted with electronic components extending into said shell-shaped section of said second electronic housing part, and is designed so that it can be preassembled and fixed in position in said electronic housing.

5. The drive unit of claim 1 wherein said printed-circuit board is fitted with electronic components extending into said shell-shaped section of said second electronic housing part, and is designed so that it can be preassembled and fixed in position in said housing flange of said gear housing.

6. The drive unit of claim 1 wherein said printed-circuit board is fitted with brushes, and is designed so that it can be preassembled and fixed in position in said electronic housing.

7. The drive unit of claim 1 wherein said printed-circuit board is fitted with brushes, and is designed so that it can be preassembled and fixed in position in said housing flange of said gear housing.

8. The drive unit of claim 1 wherein said printed-circuit board is fitted with contact elements and their corresponding connections, and is designed so that it can be preassembled and fixed in position in said electronic housing.

9. The drive unit of claim 1 wherein said printed-circuit board is fitted with contact elements and their corresponding connections, and is designed so that it can be preassembled and fixed in position in said housing flange of said gear housing.

10. The drive unit of claim 1 wherein said printed-circuit board is designed to be axially fitted from a front side and to be contacted by means of the dip-soldering of contact pins that are inserted through a back side.

11. The drive unit of claim 1 wherein said printed-circuit board is designed to be axially fitted from a side of the commutator motor and to be contacted by means of the dip-soldering of contact pins that are inserted through a second side.

12. The drive unit of claim 1 further comprising:

e) sealing rims being applied to the electronic housing on a side of a contact rim and abutting against said front-side housing flange of said motor housing.

13. The drive unit of claim 12 wherein said sealing rims are sprayed on sealing rims.

14. The drive unit of claim 1 further comprising:

e) sealing rims being applied to the electronic housing on a side of a contact rim and abutting against said front-side housing flange of said gear housing.

15. The drive unit of claim 14 wherein said sealing rims are sprayed on sealing rims.

16. The drive unit of claim 1 further comprising:

a covering guide sleeve, extending axially, radially within said motor housing, axially overlapping a commutator area of the commutator motor, and being premolded on said printed-circuit board.

17. The drive unit of claim 1 wherein said printed-circuit board includes guide receptacles, and wherein said front-side housing flange of said gear housing includes premolded, axially projecting guide webs which fit, axially, into corresponding ones of said guide receptacles of said printed-circuit board.

18. The drive unit of claim 1 wherein said housing flange of said gear housing includes guide receptacles, and wherein said printed circuit board includes premolded axially projecting guide webs, which fit, axially, into corresponding ones of said guide receptacles of said front-side housing flange of said gear housing.

19. The drive unit of claim 1 wherein said motor housing, said electronic housing, said printed-circuit board, and said gear housing make up parts of one constructional unit that can be joined in an axial assembly operation.

20. A commutator-motor gear drive unit comprising:

a) a rotor shaft, i) defining an axis, having a first axial side and a second axial side;

b) a gear housing, i) radially surrounding an axial section of said rotor shaft, ii) having an upper section and a radially extending lower section, and iii) having a flange surface defining a plane perpendicular to said axis;

c) an electronic housing, i) having a first side facing said first axial side and being sealed against said flange surface of said gear housing, ii) having an upper section defining a void, iii) having a lower section defining a cup shaped shell extending towards said second axial side and open on an end facing said first axial side and iv) having a second side facing said second axial side;

d) a motor housing, i) having a flange surface sealed against said second side of said electronic housing at said upper section of said electronic housing, and ii) radially surrounding said rotor shaft; and e) a printed circuit board, i) held on said electronic housing, and ii) sealed within a cavity defined by said gear housing, said electronic housing, and said motor housing.

* * * * *